United States Patent
Bergenudd

(10) Patent No.: US 7,092,919 B2
(45) Date of Patent: Aug. 15, 2006

(54) METHOD AND A SYSTEM RELATED TO DETERMINING THE PRICE OF A COMBINATION CONTRACT

(75) Inventor: Johan Bergenudd, Stockholm (SE)

(73) Assignee: OMX Technology AB, Stockholm (SE)

(*) Notice: Subject to any disclaimer, the term of this patent is extended or adjusted under 35 U.S.C. 154(b) by 1052 days.

(21) Appl. No.: 09/881,209

(22) Filed: Jun. 15, 2001

(65) Prior Publication Data

US 2003/0004899 A1 Jan. 2, 2003

(51) Int. Cl.
G06F 17/00 (2006.01)
G06G 7/00 (2006.01)
G06Q 40/00 (2006.01)
G06Q 99/00 (2006.01)

(52) U.S. Cl. .............................. 705/400; 705/37; 705/1
(58) Field of Classification Search ................ 705/400, 705/1, 37
See application file for complete search history.

(56) References Cited

U.S. PATENT DOCUMENTS

| | | | | |
|---|---|---|---|---|
| 3,581,072 A | * | 5/1971 | Frederick | 705/37 |
| 4,412,287 A | * | 10/1983 | Braddock, III | 705/37 |
| 4,503,503 A | * | 3/1985 | Suzuki | 705/400 |
| 4,674,044 A | * | 6/1987 | Kalmus et al. | 705/37 |
| 5,063,506 A | * | 11/1991 | Brockwell et al. | 705/7 |
| 5,383,129 A | * | 1/1995 | Farrell | 705/400 |
| 5,546,564 A | * | 8/1996 | Horie | 703/1 |
| 5,950,176 A | * | 9/1999 | Keiser et al. | 705/36 R |
| 6,035,287 A | * | 3/2000 | Stallaert et al. | 705/37 |
| 6,226,625 B1 | * | 5/2001 | Levenstein | 705/400 |

* cited by examiner

Primary Examiner—John W. Hayes
Assistant Examiner—Rutao Wu
(74) Attorney, Agent, or Firm—Nixon & Vanderhye P.C.

(57) ABSTRACT

In a combination contract, up to two different prices can be selected for each leg or sub-contract. The number of products for each leg or sub-contract are allocated between the two prices. Allowing each sub-contract to be traded at different price ticks within the spread ensures a correct net price for the combination contract, which can be repeated any number of times.

20 Claims, 2 Drawing Sheets

METHOD AND A SYSTEM RELATED TO DETERMINING THE PRICE OF A COMBINATION CONTRACT

TECHNICAL FIELD

The present invention relates to an automated exchange system, and in particular to an automated exchange designed for trading combinations of contracts.

BACKGROUND

When trading contracts for commodities, financial instruments or the like at an exchange in is quite common that the parties involved in the trade want to trade a number of different contracts all at the same time. Such an order involving a number of simultaneous trades of different products usually is given the precondition that the combined price for all the different subcontracts is equal or better than a predetermined price.

An order involving a number of different simultaneous trades of contracts is usually referred to as a combination order or a combination contract order. For example, a person may wish to buy 7 contracts A and sell 6 contracts B and not pay more than $100 for the whole combination contract. The amount that the person pays or receives when a combination order is traded is referred to the net price of the combination order.

Furthermore, when a combination contract (or a number of them) is to be executed at a given net price, it is often necessary to determine the price for each product/sub-contract of the combination order. The price for each sub-contract, sometimes referred to as a"leg," must be set so that when executing all the legs of a combination contract, the total price of all legs will equal the net price of the combination.

However, the prices for the sub-contracts can not be set arbitrarily. The reason for this is the price structure of most existing exchanges. The price for a given contract is generally traded at a discrete price. In other words, the contract price has to be at a valid price tick, i.e. an integer times the tick size. Also, there is a restriction that the net price has to be a valid price tick. For each product at each particular time, there will also be a valid "interval" corresponding to the price gap between the best selling price and best buying price (bid/ask), which is termed the "spread."

When trading combination contracts, it is always desired and in some cases required that the price for each sub-contract/leg be within the spread at the time when the combination order is traded.

However, today there exist no way of ensuring that all legs are traded within the spread for each product traded in the combination contract. The problem arises from the fact that the sub-contracts are all traded at discrete prices. Thus, the prices for the individual legs in some cases are hard to find regardless of which multipliers the legs in the combination have, regardless of the different spreads, regardless of the tick size, regardless of the combination quantity, and regardless of the net price at which the combination order is matched.

An additional problem relates to the calculations carried out in an automated exchange system when trying to determine the prices for the individual legs. Such calculations using a conventional algorithm are extensive, and use much processor power. Even then, conventional calculations still may fail to deliver prices for the individual legs that are within the spread. The practical result is to let one or more of the legs be traded at a price outside the current spread or to reject the combination order.

Hence, there is a need to find a way to ensure that all combination orders can be traded regardless of which multipliers the legs in the combination contract have, regardless of the different spreads, regardless of the tick size, regardless of the combination quantity and regardless of the net price. The solution should preferably also reduce the processor load.

SUMMARY

It is an object of the present invention to provide an improved computerized trading system for trading combination orders that determine the prices for the individual legs regardless of which multipliers the legs in the combination have, regardless of the different spreads, regardless of the tick size, regardless of the combination quantity, and regardless of the net price at which orders are matched.

It is another object of the present invention to provide a computerized trading system for trading combination orders that uses less processor power for calculating and determining the prices for the individual legs of a combination order by reliably providing a solution with a correct net price.

These objects and others are obtained by the present invention. For each leg, up to two different prices are selected. The number of products that the multiplier states are allocated between the two prices. Allowing each sub-contract to be traded at, at least, two different ticks within the spread ensures a correct net price for each combination contract, which can be repeated any number of times (combination quantity).

BRIEF DESCRIPTION OF THE DRAWINGS

The present invention will now be described in more detail by way of non-limiting examples and with reference to the accompanying drawings, in which.

DETAILED DESCRIPTION

Figure 1:
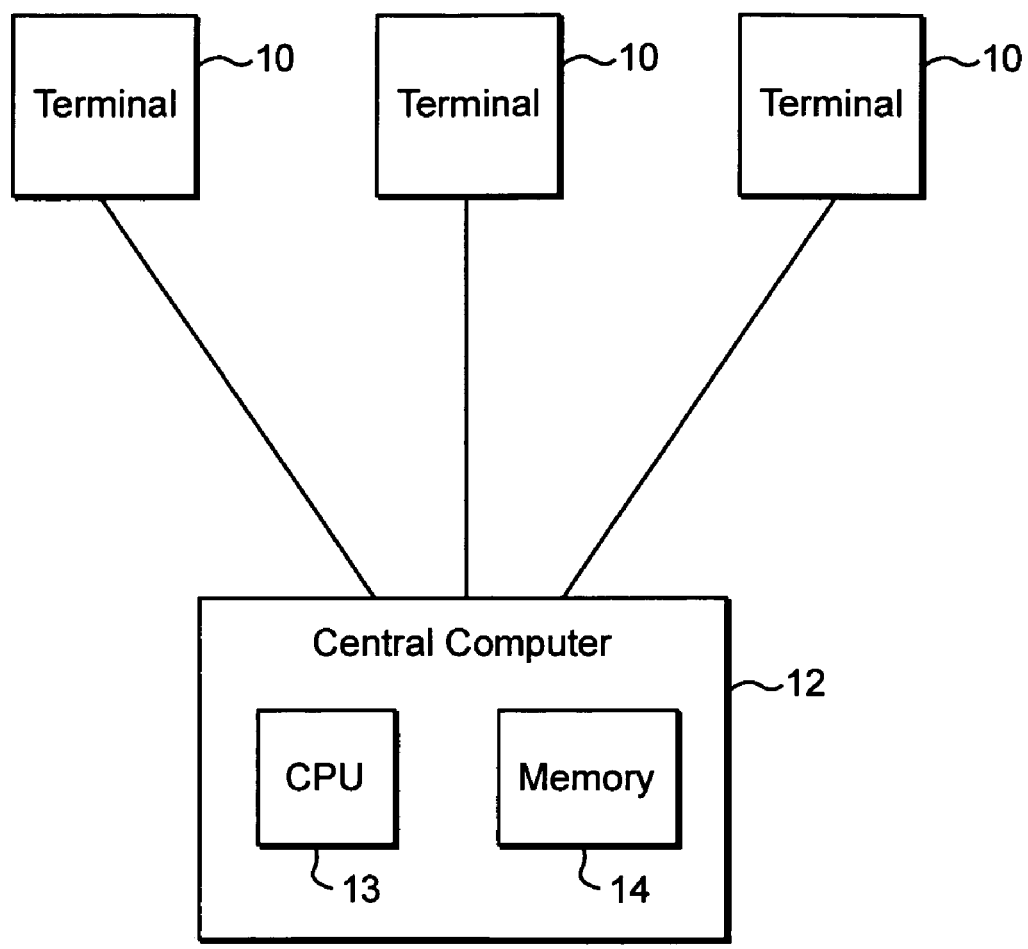
FIG. 1 is a general view of an automated exchange system.

In FIG. 1, a general view of an automated exchange system is shown. The system comprises a number of remote terminals 10 all connected to a central computer 12 comprising a Central Processing Unit (CPU) 13 and a memory 14 associated therewith. The central computer 12, when loaded with suitable software, such as the CLICK® software sold by OM Technology AB, Sweden, forms an automated exchange having the features and functionality of a conventional automated exchange. The remote terminals 10 are designed to send data to and receive data from the central computer 12. The terminals 10 are further designed to provide an interface for investors, such as broker firms etc., trading contracts including combination contracts at the automated exchange.

When trading a combination order in the system shown in FIG. 1, for each leg, up to two different prices can preferably be selected. Further, the number of products that the multiplier states are allocated between the two prices. By allowing the exchange to use different prices for the same product, a correct net price for each combination contract, which can be repeated any number of times (i.e., combination quantity), can be obtained.

Thus, given a combination contract, a tick size, and a valid price interval for the product of each leg, there will be a valid price interval for the net price. If the net price is outside that interval, there is no valid solution. Such an order will not matched in the system.

Figure 2:
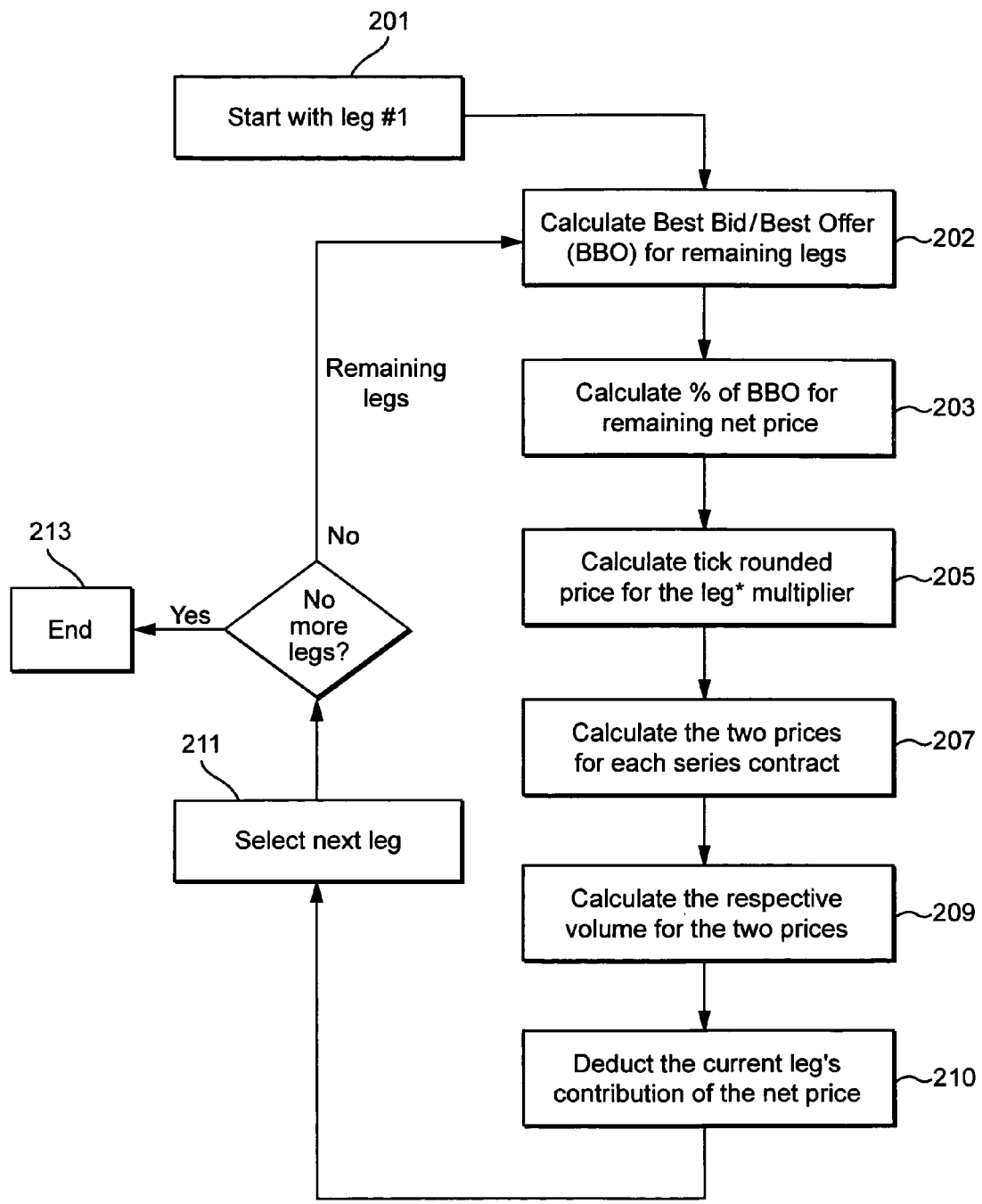
FIG. 2 is a flow chart illustrating different steps carried out when determining the prices for individual legs in a combination contract.

In FIG. 2, a flow chart illustrating the different steps when calculating the different prices for the different legs is shown. The prices, e.g., Best Bid/Best Offer (BBO), are preferably calculated one leg at a time, and the first leg is initially calculated as indicated in step 201 and 202. Next, in step 203, a percentage is determined using the net price in relation the combination spread as input. The percentage is set as the difference between the net price and the bid price of the current leg divided by the spread for the current leg.

For the current leg, the percentage determined in step 203 is applied to the multiplier times the spread of that product, which gives an optimum price, step 205. Two valid prices are then selected in a step 207, with one tick apart so that one is above and one below (or at) the optimum price divided by the multiplier.

Depending on where the optimum price is compared with the two selected prices, the number of products given by the multiplier is allocated between the two prices so that the average price comes as close as possible to the optimum price, step 209. When the prices for the first leg are determined, their contribution is subtracted from the net price, step 210 and the calculations are repeated as indicated in step 211 for the remaining legs using the residual net price in the calculations. The procedure is repeated until there are no more legs in the combination contract and the procedure then ends in a step 213.

For example, assume that two products, called A and B are traded at the automated exchange shown in FIG. 1. Assume that the tick size is 1, i.e. the minimum difference between two prices. Assume that the spread for A is 4 to 5, i.e. the bid price is 4 and the ask price is 5 and assume that the spread for B is 6 to 7. Assume further that a combination order to buy 5 A and sell 2 B (i.e. one combination contract) is sent to the exchange.

Thus in this example, the minimum allowed net price is 6 (5*4−2*7=6) and maximum allowed net price is 13 (5*5−2*6=13). In this example, the net price is set to 9; i.e. the combination contract is to be traded at the price 9. If the price for A is selected to 4, the price for B would have to be 5.50, which cannot be handled, since the tick size is 1 and which also is outside the spread. The other allowed price for A is 5, and then the price for B would have to be 8 to give the correct net price, which is outside the spread.

Using the algorithm as described herein the prices for the individual legs would be 3 contracts A at the price 4 and 2 contracts A at the price 5, and 1 contract B at the price 6 and 1 contract B at the price 7. This gives the correct net price for each combination contract and it can thus be multiplied with any combination quantity.

Below an exemplary computer program for implementing the algorithm described in conjunction with FIG. 2 is shown.

```
// Perform some preparatory calculations
cs_ask[#legs+1] = 0
cs_bid[#legs+1] = 0
loop i: number of legs . . . 1
    if (COMBO.leg[i].operation == BUY)
        c_ask[i] = get_ask_price (COMBO.leg[i].product)
```

-continued

```
        c_bid[i] = get_bid_price (COMBO.leg[i].product)
    else
        c_ask[i] = -get_bid_price (COMBO.leg[i].product)
        c_bid[i] = -get_ask_price (COMBO.leg[i].product)
    c_ask[i] *= COMBO.leg[i].multipl
    c_bid[i] *= COMBO.leg[i].multipl
    cs_ask[i] = c_ask[i] + cs_ask[i+1]
    cs_bid[i] = c_bid[i] + cs_bid[i+1]
endloop
// cs_bid[1] and cs_ask[1] now contains the allowed spread for the
combo
// Validation of the combo contract is within spread
tmp_net = COMBO.net_price
if (tmp_net < cs_bid[1] || tmp_net > cs_ask[1])
    return NOK
loop i: 1 . . . #legs
    percent = (tmp_net − cs_bid[i]) / (cs_ask[i] − cs_bid[i])
    tmp_pri = abs (percent*(c_ask[i] − c_bid[i]) + c_bid[i])
    // Note that the line below should not be performed for the last
    // leg if the algorithm is modified as described below
    tmp_pri = tick_size * round (tmp_pri/tick_size)
    tmp_pri /= COMBO.leg[i].multipl
    low_pri[i] = tick_size * floor (tmp_pri/tick_size)
    high_pri[i] = low_pri[i] + tick_size
    hpr_vol[i] = (tmp_pri − low_pri[i]) * COMBO.leg[i].multipl /
tick_size
    lpr_vol[i] = COMBO.leg[i].multipl − hpr_vol[i]
    if (COMBO.leg[i].operation == BUY)
        tmp_net −= tmp_pri * COMBO.leg[i].multipl
    else
        tmp_net += tmp_pri * COMBO.leg[i].multipl
endloop
```

Furthermore, it is quite common that the tick size varies over the whole price interval. This can also be handled by the algorithm as described herein provided that the combination tick size is an integer times each tick size. When the two valid prices are selected one tick apart, it is preferred to use the tick size that is valid at the optimum price divided by the multiplier.

Typically, when the tick size varies over the price interval, the combination tick size will equal the smallest tick size. Such cases can also be handled by the algorithm as long as all tick sizes are a multiple of the combination tick size (vice versa can also be combined). First of all, the legs with non-zero spread are preferably sorted so that the legs with the smallest tick size are calculated last. A change in the algorithm is also required. It should not to round the value for the last leg (marked in the pseudo code above). Then under certain circumstances, two selected volumes will in many cases be non-integers. By converting those to fractional numbers, it can be determined which combination quantities that will still yield an integer value for the number of products at each price. It the smallest tick size equals the combination tick size, the solution will always be integer values and it will thus provide a result for any combination quantity. A common example is that the larger tick size is twice the smaller and that the combination tick size equals the smaller tick size. In this case if the net price is an odd number of small ticks and the tick size for each leg is the larger value, then the combination quantity must be an even number for the problem to have a valid solution.

In the examples above, it is assumed that there is a requirement that all prices determined must be at valid ticks and within certain interval. If in certain applications such requirements do not exist, the algorithm can of course still be used.

If it for some reason is determined that the spread for a particular leg is zero, that violates one of the initial assumptions for the algorithm. But this case can nonetheless be handled. In that case, the legs are only given one valid price, no spread are calculated first, and the legs are assigned only the valid price. Their contribution is then first subtracted from the net-price, and the algorithm is then applied to the remaining legs. If the spread is negative, it is impossible to assign a valid price, and the combination can thus not be priced.

None of the above description should be read as implying that any particular element, step, range, or function is essential such that it must be included in the claims scope. The scope of patented subject matter is defined only by the claims. The extent of legal protection is defined by the words recited in the allowed claims and their equivalents. No claim is intended to invoke paragraph 6 of 35 USC §112 unless the words "means for" are used.

The invention claimed is:

1. A method of determining the price of individual sub-contracts in a combination contract for different products in an automated exchange including a central computer having a CPU and a memory, the automated exchange being programmed to execute the method comprising the steps of:
   receiving a signal transmission from a remote terminal configured to communicate with the automated exchange, the signal transmission including the combination contract which specifies a first number of sub-contracts for a first product, a second number of sub-contracts for a second product and a net-price, wherein the first of the products in the combination contract has a non zero price spread;
   for the first product, selecting a plurality of different prices for the first number of sub-contracts;
   determining the price of the individual sub-contracts based on the plurality of different prices; and
   providing the combination contract for matching in the automated exchange using the determined individual sub-contract prices.

2. A method according to claim 1, wherein the prices for the individual sub-contracts are calculated product-by-product.

3. A method according to claim 1, wherein when at least one product in the combination contract has a zero-spread, the method further comprises the step of deducing the price contribution from the zero spread product(s) before determining the prices for the remaining product(s).

4. A method according to claim 1, wherein when a tick size varies over the valid price interval of a product, the method further comprises selecting a tick size valid at an optimal price divided by a multiplier which specifies a number of sub-contracts for the product.

5. A method according to claim 1, wherein when a tick size of a product varies over the valid price interval and a corresponding product combination tick size is equal to a smallest tick size, the method further comprises sorting the sub-contracts with non-zero spread so that the sub-contracts with the smallest tick size are calculated last.

6. A method according to claim 1, wherein when at least one sub-contract has only one valid price, the method further comprises first deducting the price of said at least one sub-contract having only one valid price from a net price of the combination contract before determining prices of remaining sub-contracts of the combination contract.

7. An automated exchange comprising:
   means for receiving a signal transmission from a remote terminal configured to communicate with the automated exchange, the signal transmission including the combination contract which specifies a first number of sub-contracts for a first product and a second number of sub-contracts for a second product and a net-price, at least the first of the products in the combination contract having a non-zero spread;
   means for selecting a plurality of different prices for the first number of sub-contracts for at least the first product; and
   means for determining the price of the individual sub-contracts based on the plurality of different prices.

8. A system according to claim 7, comprising means for calculating prices for the individual sub-contracts product-by-product.

9. A system according to claim 7, further comprising means for deducting a price contribution from zero-spread product before determining prices for a remaining product when at least one product in the combination contract has a zero-spread.

10. A system according to claim 7, further comprising means for selecting a tick size valid at an optimal price divided by a multiplier which specifies a number of sub-contracts for the product when the tick size varies over a valid price interval of a product.

11. A system according to claim 7, further comprising means for sorting sub-contracts with non-zero spread so hat sub-contracts with a smallest tick size are calculated last when a tick size of a product varies over the valid price interval and a corresponding product combination tick size is equal to the smallest tick size.

12. A system according to claim 7, further comprising means for initially deducting a price of any sub-contract having only one valid price from a net-price of the combination contract before determining prices of remaining sub-contracts of the combination contract.

13. The system according to claim 7, further comprising means for providing the combination contract for matching in the automated exchange using the determined individual sub-contract prices.

14. A program product embodied in a computer readable medium for use in an automated exchange, comprising computer executable instructions for:
   receiving a signal transmission from a remote terminal configured to communicate with the automated exchange, the signal transmission including the combination contract which specifies a first number of sub-contracts for a first product and a second number of sub-contracts for a second product and a net-price, at least the first of the products in the combination contract having a non-zero spread;
   selecting a plurality of different prices for the first number of sub-contracts for at least the first product; and
   determining the price of the individual sub-contracts based on the plurality of different prices.

15. A program product embodied in a computer readable medium according to claim 14, further comprising instructions for calculating prices for the individual sub-contracts product-by-product.

16. A program product embodied in a computer readable medium according to claim 14, further comprising instructions for deducting a price contribution from a zero-spread product before determining a price for a remaining product when at least one product in the combination contract has a zero-spread.

17. A program product embodied in a computer readable medium according to claim 14, further comprising instructions for selecting a tick size valid at an optimal price divided by a multiplier which specifies a number of sub-contracts for the product when the tick size varies over a valid price interval of a product.

18. A program product embodied in a computer readable medium according to claim 14, further comprising instructions for sorting sub-contracts with non-zero spread so that sub-contracts with a smallest tick size are calculated last, when the tick of a product varies over a valid price interval and a corresponding product combination tick size is equal to the smallest tick size.

19. A program product embodied in a computer readable medium according to claim 14, further comprising instructions for initially deducting a price of any sub-contract having only one valid price from a net price of the combination contract before determining a price of a remaining sub-contract of the combination contract.

20. A program product embodied in a computer readable medium according to claim 14, further comprising instructions for providing the combination contract for matching in the automated exchange using the determined individual sub-contract prices.

* * * * *